US007043535B2

(12) United States Patent
Chi et al.

(10) Patent No.: US 7,043,535 B2
(45) Date of Patent: May 9, 2006

(54) SYSTEMS AND METHODS FOR COMBINED BROWSING AND SEARCHING IN A DOCUMENT COLLECTION BASED ON INFORMATION SCENT

(75) Inventors: Ed H. Chi, Palo Alto, CA (US); Chris Olston, Los Altos, CA (US)

(73) Assignee: Xerox Corporation, Stamford, CT (US)

( * ) Notice: Subject to any disclaimer, the term of this patent is extended or adjusted under 35 U.S.C. 154(b) by 829 days.

(21) Appl. No.: 09/821,025

(22) Filed: Mar. 30, 2001

(65) Prior Publication Data

US 2002/0143940 A1   Oct. 3, 2002

(51) Int. Cl.
*G06F 15/16* (2006.01)
(52) U.S. Cl. .................. 709/218; 709/203; 709/217
(58) Field of Classification Search ............. 345/709; 709/218, 203, 217
See application file for complete search history.

(56) References Cited

U.S. PATENT DOCUMENTS

| 5,963,969 | A  | * | 10/1999 | Tidwell ................. 715/531 |
| 6,070,160 | A  | * | 5/2000  | Geary ..................... 707/4 |
| 6,339,437 | B1 | * | 1/2002  | Nielsen ................. 715/787 |
| 6,340,977 | B1 | * | 1/2002  | Lui et al. .............. 345/709 |
| 6,615,172 | B1 | * | 9/2003  | Bennett et al. ........ 704/257 |

FOREIGN PATENT DOCUMENTS

| EP | 0 860 786 A2 | 8/1998 |
| EP | 1 069 515 A1 | 1/2001 |

OTHER PUBLICATIONS

"5 Polygonal Primitives", Mayadocs, 1999.*
Cheung, D.W., Kao, B., and Lee, J. (1997). Discovering user access patterns on the World Wide Web. Proceedings of the First Pacific-Asia Conference on Knowledge Discovery and Data Mining, PAKDD '97, Singapore.
Sarukkai, R. (2000). Link prediction and path analysis using Markov chains. Proceedings of the Ninth International World Wide Web Conference, WWW9, Amsterdam, The Netherlands. Computer Networks, vol. 33, num. 1-6 (pp. 377-386).
Pirolli, P. and Card, S.K. (in press). Information foraging. Psychological Review.
Pirolli, P. (1997). Computational models of information scent-following in a very large browsable text collection. Proceedings of the ACM Conference of Human Factors in Computing Systems, CHI '97 (pp. 3-10), Atlanta, GA.

(Continued)

*Primary Examiner*—Bunjob Jaroenchonwanit
*Assistant Examiner*—Chad Zhong
(74) *Attorney, Agent, or Firm*—Oliff & Berridge, PLC (57) ABSTRACT

Techniques are provided for combining searching and browsing into a single interface. The topology and content of a document collection or web site is determined and user information need keywords are determined. Relevant documents are identified using search techniques and the relevant document paths determined. The relevant document paths are analyzed using information scent to generate information scent values for the relevant document paths. A display attribute of the associated connection or link is then synthesized based on the information scent, the keywords and the document. The process repeats for each new document or web page.

9 Claims, 8 Drawing Sheets

OTHER PUBLICATIONS

Huberman, B.A., Pirolli, P., Pitkow, J.E., and Lukose, R.M. (1998). Strong Regularities in World Wide Web Surfing. Science, Apr. 3, 1998, vol. 280, num. 5360 (pp. 95-97).

Adamic, L.A. (1999). The small world Web. Proceedings of the Third European Conference on Research and Advanced Technology for Digital Libraries, ECDL '99 (pp. 443-452), Paris, France.

Barrett, R., Maglio, P.P., and Kellem, D.C. (1997). How to personalize the Web. Proceedings of the ACM Conference on Human Factors in Computing System, CHI '97 (pp. 75-82), Atlanta, GA.

Greer, J.E. and Phillip, T. (1997). Guided navigation through hyperspace. Proceedings of the Eighth World Conference on Artificial Intelligence in Education, AI-ED '97, Kobe, Japan.

Park, J., Kim, J. (2000). Effects of Contexual Navigation Aids on Browsing Diverse Web Systems. Proceedings of the ACM Conference on Human Factors in Computing Systems, CHI 2000 (pp. 257-264), The Hague, The Netherlands.

Hersovici, M., Jacovi, M., Maarek, Y.S., Pelleg, D., Shtalhaim, M., and Ur, S. (1998). The shark-search algorithm—An application: tailored Web site mapping. Proceedings of the Seventh International World Wide Web Conference, WWW7, Brisbane, Australia. Computer Networkds, vol. 30, num. 1-7 (pp. 317-326).

Perkowitz, M. and Etzioni, O. (1999). Towards adaptive Web sites: Conceptual framework and case study. Proceedings of the Eighth International World Wide Web Conference, WWW8, Toronto, Canada. Computer Networks, vol. 31, num. 11-16 (pp. 1245-1258).

Campbell, C.S. and Maglio, P.P. (1999). Facilitating navigation in information spaces: Road signs on the World Wide Web. International Journal of Human-Computer Studies, vol. 50 (pp. 309-327).

Golovchinsky, G. (1997). Queries? Links? Is there a difference? Proceedings of the ACM Conference on Human Factors in Computing Systems, CHI 1997 (pp. 407-414), Atlanta, GA.

Yan, T.W., Jacobsen, M., Garcia-Molina, H., and Dayal, U. (1996). From User Access Patterns to Dynamic Hypertext Linking. Proceedings of the Fifth International World Wide Web Conference, WWW5, Paris, France. Computer Networks, vol. 28, num. 7-11 (pp. 1007-1014).

Chi et al., "The Scent of a Site: A System for Analyzing and Predicting Information scent, Usage and Usability of a Web Site," CHI 2000 (XP-001090174),(pp. 161-168), New York (Apr. 2000).

Pirolli et al., "Silk from a Sow's Ear: Extracting Usable Structures from the Web," CHI '96 (XP-002128179), Jul. 1996.

* cited by examiner

Welcome to the Corporate Web Site for ABC Corp.
For information concerning the following products, select one of the following links
copier products
fax machine products
other products

Keyword: remote diagnostics

FIG. 8

Welcome to the Corporate Web Site for ABC Corp.
For information concerning the following products, select one of the following links
copier products
fax machine products
other products Keyword: AB 5001

FIG. 9

Welcome to the Corporate Web Site for ABC Corp.
For information concerning the following products, select one of the following links
copier products
fax machine products
other products Keyword: AB 4411 copier features

FIG. 10

SYSTEMS AND METHODS FOR COMBINED BROWSING AND SEARCHING IN A DOCUMENT COLLECTION BASED ON INFORMATION SCENT

GOVERNMENT LICENSE PROVISION

The U.S. Government has a paid-up license in this invention and the right in limited circumstances to require the patent owner to license others on reasonable terms as provided for by the terms of Contract No. N00014-96-C-0097 awarded by the Office of Naval Research.

The following applications and U.S. Patents: "SYSTEMS AND METHODS FOR IDENTIFYING USER TYPES USING MULTI-MODAL CLUSTERING AND INFORMATION SCENT", by E. Chi et al., filed Mar. 30, 2001, U.S. Patent Publication No. U.S. 2003/018636 A1; "SYSTEMS AND METHODS FOR PREDICTING USAGE OF A WEB SITE USING PROXIMAL CUES", by E. Chi et al., filed Mar. 30, 2001, U.S. Patent Publication No. U.S. 2002/0143802 A1; "SYSTEMS AND METHOD FOR INFORMATION BROWSING USING MULTI-MODAL FEATURES", by F. Chen et al., filed Oct. 19, 1999, U.S. Pat. No. 6,728,752 B1; "SYSTEM AND METHOD FOR PROVIDING RECOMMENDATIONS BASED ON MULTI-MODAL USER CLUSTERS", by H. Schuetze et al., filed Oct. 19, 1999, U.S. Pat. No. 6,567,797 B1; "SYSTEM AND METHOD FOR QUANTITATIVELY REPRESENTING DATA OBJECTS IN VECTOR SPACE", by H. Schuetze et al., filed Oct. 19, 1999, U.S. Patent Publication No. U.S. 2003/0074368 A1; "SYSTEM AND METHOD FOR IDENTIFYING SIMILARITIES AMONG DOCUMENTS IN A COLLECTION", by H. Schuetze et al., filed Oct. 19, 1999, U.S. Patent Publication No. U.S. 2003/0074369 A1; "SYSTEM AND METHOD FOR CLUSTERING DATA OBJECTS IN A COLLECTION", Schuetze et al., filed Oct. 19, 1999, U.S. Pat. No. 6,598,054 B2; "SYSTEM AND METHOD FOR VISUALLY REPRESENTING THE CONTENTS OF A MULTIPLE DATA OBJECT CLUSTER", by H. Schuetze et al., filed Oct. 19, 1999, U.S. Pat. No. 6,564,202 B1; "SYSTEM AND METHOD FOR INFERRING USER INFORMATION NEED IN A HYPERMEDIA LINKED DOCUMENT COLLECTION" by Ed Chi et al., filed Mar. 31, 2000, as U.S. application Ser. No. 09/540063; are each incorporated herein by reference in the entirety.

BACKGROUND OF THE INVENTION

1. Field of Invention

This invention relates to computer assisted search and retrieval systems and systems and methods for combined browsing and searching of a document collection or web site.

2. Description of Related Art

The ability to manage information is increasingly important in the modern information economy. As the reach of corporate information systems is extended to suppliers and customers, timely access to corporate information repositories becomes critical. Therefore, web site designers and information architects need to provide users with tools that facilitate efficient access to required information.

Users interact with conventional information systems to accomplish tasks using distinct modes of access. If a user is familiar with the terminology used in a particular domain, such as printers, the user is likely to know the keywords likely to retrieve relevant information required to complete the user's task. For example, the use of the word "multi-function" to describe machines that combine printer, scanner, copier and fax capabilities. The task of determining what "multi-function" printers exist may be accomplished using the search mode of an information system. The keywords are entered and the results are displayed as a list of documents containing the keywords. The user then selects the document that appears most relevant and reads each document presented.

However, in the search mode, if the user selects keywords that are too specific or not relevant to the subject matter, few if any documents will be selected and the user is given the false impression that no information exists. For example, if "multi-function laser" were entered, the displayed documents would probably not include multi-function units that employed ink jet print output devices.

If the user selects keywords that are not specific enough, too many documents will be selected and the user will be overloaded with extraneous documents. Since few users will review the second or subsequent pages of a search request, the retrieval of large amounts of information tends to increase the user's cognitive overhead If a user is unfamiliar with the subject area and therefore does not know the relevant keywords to generate a search query, a browsing mode of the information system is initiated. The user then identifies the relevant subject area specific keywords. Once the relevant keywords are identified, the user may enter the search mode and initiate a keyword search based on the information obtained from browsing.

The separation of the search and browse modes results in cognitive interruptions of the user's session. As relevant keywords are identified in the browsing mode, an interruption occurs as the user switches to the search mode to determine how well the keyword functions in narrowing the search mode results. A switch back to the browse mode may then occur. Using the browse/search process, a query is gradually developed that identifies the relevant information to accomplish the user's task. However constant switching between the search and browse modes consumes a great deal of the user's cognitive attention and requires considerable user training in developing search strategies.

In response some vendors of information systems have attempted to share previous user's browse paths under the assumption that many user's will have the same information requirements. Conventional systems such as IBM's SUR-FAID information system and ALEXA INTERNET'S ToolBar 5.0 information system facilitate sharing of information obtained through a user's browsing mode experience. For example, ALEXA INTERNET'S ToolBar 5.0 information system provides a customized toolbar that is added to the client browser. Using the ToolBar 5.0 product, ALEXA INTERNET is able to compile information regarding a user's path in the browsing mode and makes suggestions of a next connection based on the similarity of the current path to accumulated historical browsing information. Similarly IBM's SURFAID information system uses On-Line Analytical Processing methods to provide a user with counts of other users following traversal paths in a browsing mode.

However, these conventional systems do not provide integration between the search mode and the browse modes. Also these conventional systems do not use information scent to determine relevancy of information tailored to the user using low cognitive overhead.

SUMMARY OF THE INVENTION

Therefore, the ability to determine high relevancy paths using information scent and to integrate the search and browse modes into a single interface would be useful.

The various exemplary embodiments of this invention provide systems and methods for combining browsing and searching of a document collection or web site using information scent.

DETAILED DESCRIPTION OF EXEMPLARY EMBODIMENTS

Figure 1:
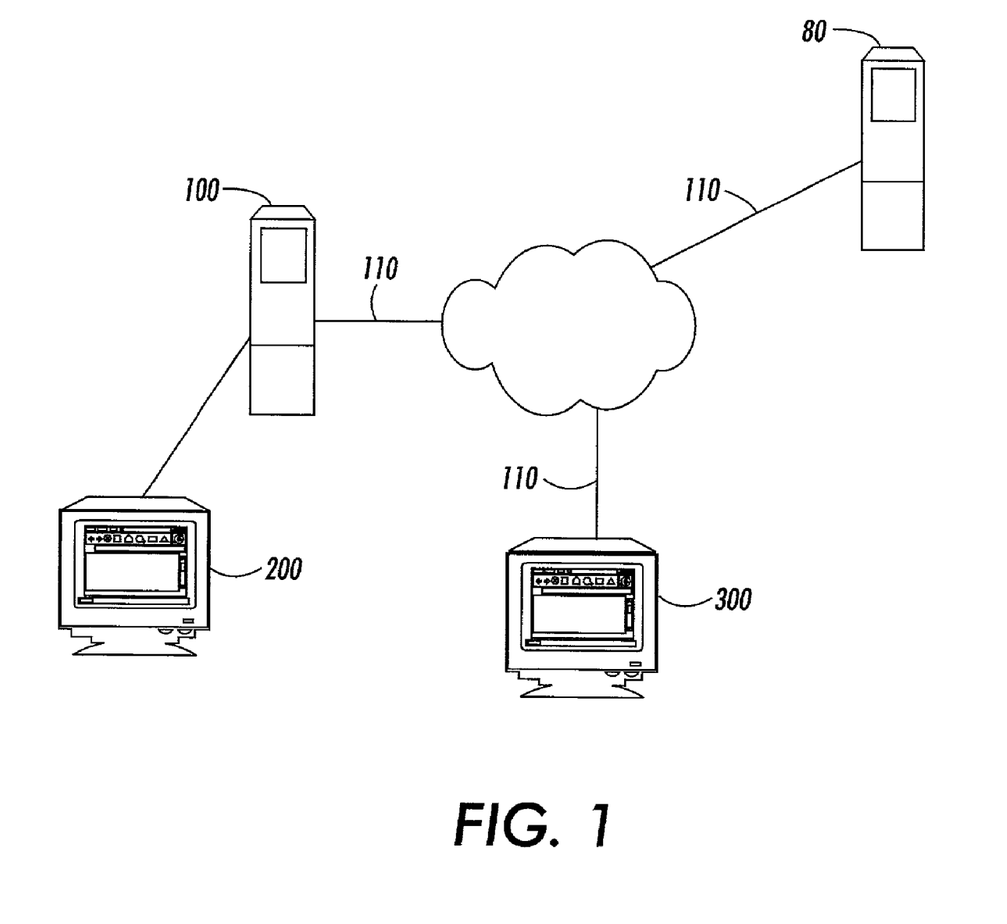
FIG. 1 shows an exemplary embodiment of a system for combined browsing and searching in a document collection based on information scent according to this invention.

FIG. 1 shows an exemplary embodiment of a system for combined browsing and searching based on information scent 100 according to this invention. Communications links 110 connect document server or web server 80 to the system for combined browsing and searching based on information scent 100.

In one exemplary embodiment according to this invention, access by the document or web browser of web-enabled computer 200, to the document server 80 over communications links 110 is mediated by the system for combined browsing and searching based on information scent 100. It will be apparent that the system can mediate access by acting as a proxy for access by web-enabled computer 200 to the web server 80 or in various other embodiments, by incorporating the system for combined browsing and searching based on information scent 100 within a web-enabled computer as shown in 300.

The document or web server 80 makes available documents or web pages to client document or web browsers over communications links 110. When the web browser of web-enabled computer 200 starts, the user is presented with a display that allows keyword information and an initial document or starting location in the document collection to be entered. For example, the keyword might be "remote diagnostics" and the initial document or starting location might be the ABC Corp web site at "www.abc-corp.com".

This information is then transferred to the system for combined browsing and searching based on information scent 100. The system for combined browsing and searching based on information scent 100 contains previously obtained topology and content information for each site for which access is mediated. The system for combined browsing and searching based on information scent 100 determines the document requested by the web browser of web-enabled computer 200 and initiates a request for the document or web page from document server or web server 80 over communications links 110. The retrieved document or web page is then analyzed based on the user's information goal indicated by the user-entered keywords to determine which of the connections or links on the retrieved document or web page provide the greatest flow of information scent for documents or web pages relevant to the keywords. Display attributes are then synthesized for the connections indicating the greatest flow of information scent. The display attributes can be any sensible characteristic. However, in one of the various exemplary embodiments, the font size characteristic of the connections or links of retrieved documents or web pages are synthesized to indicate increasing relevancy by increasing the font size. It will be apparent that other types of synthesized display characteristics may be used. For example, changing font color from red to green, increasing bolding of text, making the font of more relevant connections or links italics or any other known or later developed method of indicating flow of information scent may be used in the practice of this invention.

The retrieved document or web page with connections or links having the synthesized display attribute is then transferred from the system for combined browsing and searching based on information scent 100 to the web browser of web-enabled computer 200.

The web-enabled computer 300 includes a modified document or web browser that integrates the functionality of the system for combined browsing and searching based on information scent 100 into web-enabled computer 300. It will be apparent that the system for combined browsing and searching based on information scent 100 may be implemented as a server mediating access for multiple computers, as a routine or software manager on computer 300 or any other combination without departing in the practice of this invention.

Figure 2:
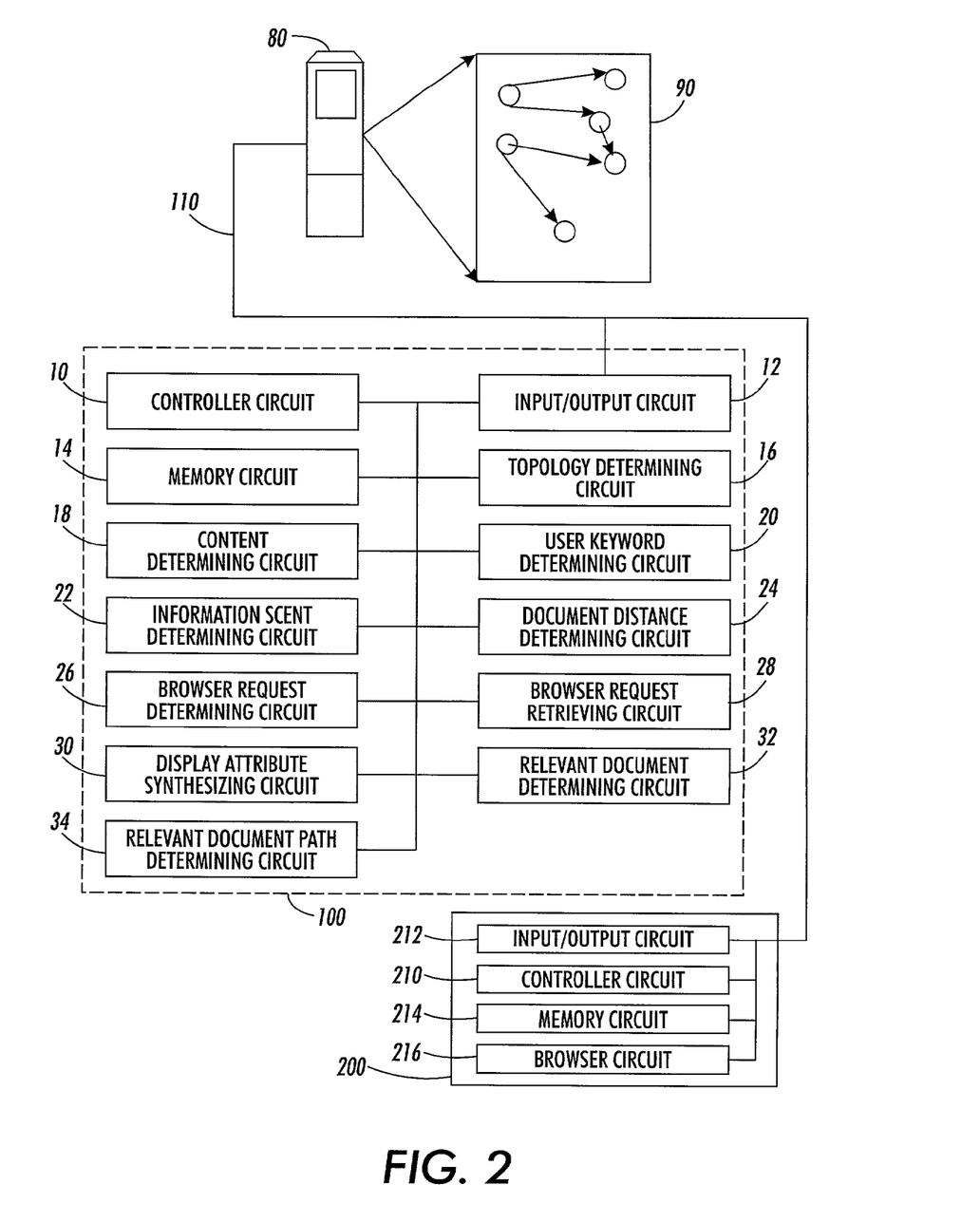
FIG. 2 show an expanded view of an exemplary embodiment of a system for combined browsing and searching in a document collection based on information scent according to this invention.

FIG. 2 shows an exemplary embodiment of a system for combined browsing and searching based on information scent 100. The system for combined browsing and searching based on information scent 100 comprises a controller circuit 10; a memory circuit 14; a topology determining circuit 16; a content determining circuit 18; a user keyword determining circuit 20; an information scent determining circuit 22; a document distance determining circuit 24; a browser request determining circuit 26; a browser request retrieving circuit 28; a display attribute synthesizing circuit 30; a relevant document determining circuit 32; a relevant document path determining circuit 34; an input/output circuit 12 connected through communications link 110 to document or web server 80 providing access to document collection or web site 90. The communications link 110 also provides a connection to input/output circuit 212 of web-enabled computer 200. Web enabled computer 200 comprises a controller circuit 210; an input/output circuit 212 for connecting to communications links 110; a memory circuit 214 and browser circuit 216.

The controller circuit 10 activates topology determining circuit 16 to retrieve topology information about web site 90 and store the information in memory circuit 14. The topology may be determined by traversing the site and identifying connections or links between documents or web pages. For example, starting at a first document or web page, the documents or web pages connected to, or linked to, the first document or web page are determined. Information indicating an association between the first document or web page and the reachable documents or web pages is stored in a topology data structure. It will be apparent that a topology data structure may include a topology matrix, a topology adjacency list or any other known or later developed technique of storing topology information about the documents or web pages in the document collection or web site.

The controller circuit 10 activates the content determining circuit 18 to retrieve content information concerning each document or web page in the document collection or web site 80 and store the content information in memory circuit 14. It will be apparent that the content information may be obtained at the same time as the topology of the document collection or web site 80 is determined by topology determining circuit 16 or may be determined after the topology has been determined. The content information may be determined using any known or later developed technique of content determination such as web crawling.

The content of each of the documents or web pages making up the document collection are determined. The words on each document or web page are added to a word/document frequency matrix. The weights of the words are determined and a weighted word document frequency matrix is created. The weighting may use term frequency/inverse document frequency, log of the term frequency, $1+(\log_{10}$ of the term frequency) or any other known or later developed technique of weighting.

The controller circuit 210 of web-enabled computer 200 activates the browser circuit 216 which generates a request for an initial document or home page. In response to the initial document or home page request from browser circuit 216 of web enabled computer 200, the system for combined browsing and searching based on information scent 100 activates the user keyword determining circuit 20 to determine the keywords describing the user's information goal or task. The keywords can be used to describe the overall task in general terms to facilitate browsing of the document collection or web site 80 or may be highly specific words in order to more quickly determine the relevant links. The greater the number of words specified, the more the results will reflect a search mode retrieval from the document collection. Similarly the fewer the number of keywords entered, the more the results will reflect a browsing mode retrieval from the document collection or web site.

When an initial document or web page is requested by the browser circuit 216 of web-enabled computer 200, the controller circuit 210 sends the browser circuit document or web page request through input/output circuit 212 over communications link 110 through the input/output circuit of the system for combined browsing and searching based on information scent 100 to the browser request determining circuit 26. The controller circuit 10 of the system for combined browsing and searching based on information scent 100 activates the browser request retrieving circuit 28 which retrieves the requested document from document or web server 80 and stores the requested document or web page in memory circuit 14.

The controller circuit 10 of the system for combined browsing and searching based on information scent 100 activates the relevant document determining circuit 32. The relevant document determining circuit 32 determines the relevant documents in the document collection or web site using a search. The search may be any known or later developed search capable of indicating documents base don the user keywords. The controller circuit 10 of the system for combined browsing and searching based on information scent 100 activates the relevant document path determining circuit 34 to determine the path between the current document or web page and each relevant document or web page. The controller 10 then transfers the relevant document path to the information scent determining circuit 22 to determine an information scent associated with the relevant document path. The information scent determining circuit 22 determines the information scent for each connection or link on the retrieved page based on the user keywords and the previously retrieved topology and content of the document collection or web site. The determination of information scent for a document collection or web site may use the techniques described in "SYSTEM AND METHOD FOR INFERRING USER INFORMATION NEED IN A HYPERMEDIA LINKED DOCUMENT COLLECTION" by Ed Chi et al., filed Mar. 31, 2000, as U.S. application Ser. No. 09/540063; incorporated herein by reference in its entirety, or any other known or later developed technique for determining information scent in a document collection of web site. Information scent according to the system for combined browsing and searching based on information scent 100 flows in the direction opposite to that of the connections or links in document collection or web site. That is, the information flows backward over a link to provide cue information as to what can be found at the connected to or linked to end of the link.

The controller 10 of the system for combined browsing and searching based on information scent 100 then activates the document distance determining circuit 24 to determine how far the relevant documents are from the current document or web page in the web site topology. The current document or web page is the current document or web page currently being retrieved. The distance between pages may be calculated by analyzing the topology information of the document collection or web site stored in memory circuit 14 or any other technique of determining the number of documents or pages between the relevant documents and the current document. The topology information may be stored in a matrix, an adjacency list or any other known or later developed structure for storing the relationship between documents or web pages.

The controller circuit 10 then adjusts the determined information scent for each current connection based on the determined document distance. The controller circuit 10 adds the determined information scent for connections leading to relevant documents or pages thereby yielding more information scent or larger scent conduits.

The controller circuit then activates the display attribute synthesizer to re-write the stored document or web page by synthesizing a display attribute based on the determined scent information. For example, a display attribute such as a font size of the connection or link in the retrieved document stored in memory circuit 14 may be synthesized. In various exemplary embodiments according to this invention, the display attribute may change to indicate the amount of scent information associated with a connection or link. Any type of visual, auditory, tactile, olfactory or taste display attribute known or later developed may be used in the practice of this invention. In various other exemplary embodiments of this invention, graphic images may also be used as connections or links. Display attributes for graphic image connections or links may include but are not limited to adding border color around the image, adding a hue saturation to the image or any other known or later developed technique of indicating changes.

The re-written document or web page is then transferred through input/output circuit 12 over communications link to the input/output circuit 212 of web-enabled computer 200. The browser circuit 216 of web-enabled computer 216 is then activated to display the re-written document or web page with synthesized display attributes indicating the information scent for each connection or link.

Figure 3:
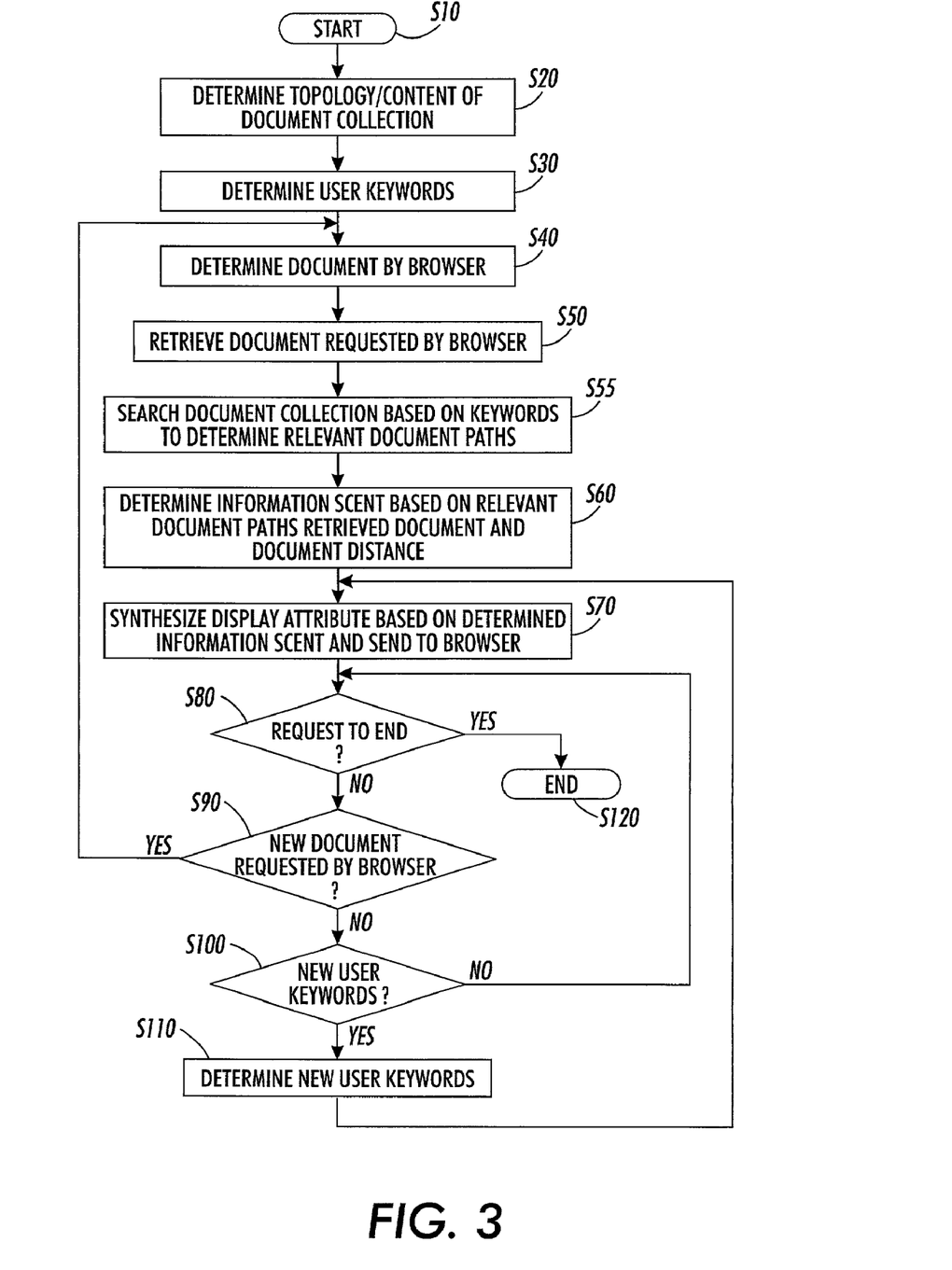
FIG. 3 is an exemplary flowchart of one embodiment of a method for combined browsing and searching in a document collection based on information scent according to this invention.

FIG. 3 is a flowchart of an exemplary embodiment of a method for combined browsing and searching based on information scent 100 according to this invention. The process starts at step S10 and immediately continues to step S20. In step S20 the topology and content of the document collection or web site is determined. Control then continues to step S30.

In step S30 the user keywords are determined. The user keywords may determined by prompting the user for the keywords using a pop-up dialog box, entry via a text field, voice input, or already stored user profiles, or any other known or later developed techniques. Control then continues to step S40 where the document requested by a user's browser is determined.

Control then continues to step S50 where the requested document is retrieved from the document collection and stored. In step S55, a search is performed in the document collection based on the user keywords. The relevant documents most closely matching the keywords are then identified and relevant document paths determined to each document. In step S60, the information scent associated with each of the determined relevant document paths is determined and an information scent vector is returned. The information scent vector indicates the relevancy of the associated connection or link for retrieval of the relevant document. The information scent is then adjusted based on a determination of how far the relevant document or web page is from the current document or page. The information scent vectors associated with a connection or link may be totaled to indicate the relevant strength of information scent associated with the connection or link. Information scent is added together for connections or links leading to multiple paths that in turn lead to multiple relevant pages. Thus an adjustment of the information scent based on the topology of the document collection or web site is determined. Control then continues to step S70.

In step S70 display attributes are synthesized based on the determined information scent. For example, a font size or color may change based on the how well the information scent for a connection or link relates to the user keywords. The re-written document or web page containing the synthesized display attributes is then sent to the browser and control continues to step S80.

In step S80 a determination is made as to whether the user has requested that the process end. For example, the user may request the termination of the process by pressing the ESC key on the keyboard or by selecting a menu item or any other known or later developed technique of indicating that termination is desired.

If the determination step S80 determines that the user wishes to end the process, control continues to step S120 and the process ends. Otherwise control continues to step S90 where a determination is made whether a new document has been requested by the browser.

If a new document has been requested, control continues to step S40 where the document requested is determined. If a new document has not been requested, control continues to step S100.

In step S100, a determination is made whether the user has entered new user keywords. The user may enter new user keywords to increase the amount of information used in determining the information scent. If the determination in step S100 determines that no further user keywords are to be entered, control continues to step S80 and the process continues. Otherwise, if it is determined in step S100 that new keywords are to be entered, control continues to step S110.

In step S110 new user keywords are determined. For example, the user may enter keywords in a dialog box, enter text in a text entry field, select from a drop down list or any other known or later developed technique for entry or determination of user keywords. Control then continues to step S70 and the process repeats until the determination is made in step S80 that the user has requested that the process be ended at which point control continues to step S120 and the process ends.

Figure 4:
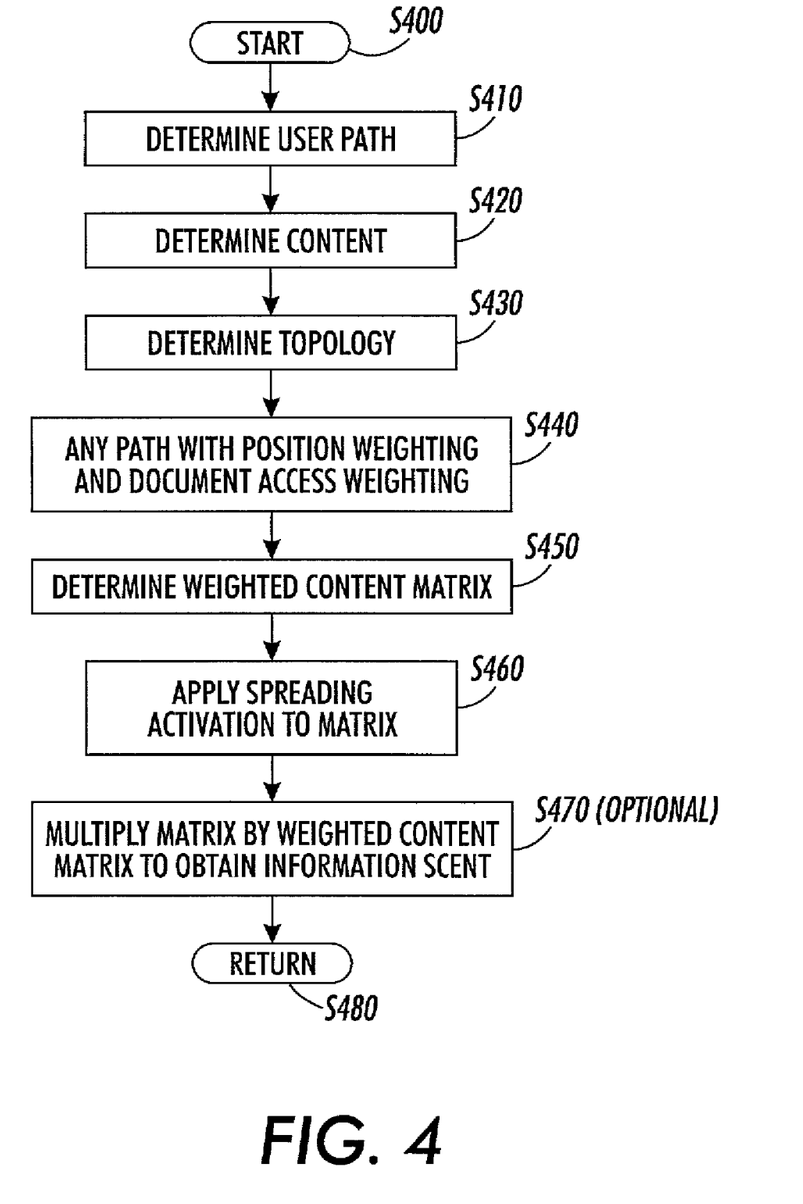
FIG. 4 shows a flowchart of an exemplary determination of information scent according to this invention.

FIG. 4 shows a flowchart of an exemplary method of determining information scent based on a relevant document path according to this invention. The process starts at step S400 and continues to step S410.

In step S410, the first relevant path to a relevant document is selected. In the exemplary embodiment, the relevant document path is determined using any known or later developed type of search to identify relevant documents based on the user keywords as described above with respect to step S55 of FIG. 3. Control then continues to step S420 where the content information for the document collection or web site is determined.

In the exemplary embodiment according to this invention, the content information is obtained from the stored content information determined in step S20 of FIG. 3. However, it will be apparent that any method of obtaining the content information may be used such as providing the content information as a parameter to the process of inferring user information need or by re-determining the content information as required. Control then continues to step S430 where the topology of the document collection or web site, is determined.

As discussed above it will be apparent that any method of obtaining the topology information may be used such as providing the topology information as a parameter to the process of inferring user information need, re-determining the topology information as required and/or retrieving the topology information stored in memory by step S20 of FIG. 3. Control then continues to step S440 where the document path position weighting and document access weighting are determined for the documents in the selected relevant document path. Control then continues to step S450.

In step S450, a weighted content data store is determined. The weighted content data structure may be a word×document matrix, a word×document adjacency list or any other known or later developed technique for storing the content information about the document collection or web site page. Control then continues to step S460.

In step S460 spreading activation according to the following formulas (1–2) is applied to generate initial document vector A.

$$A(1) = \text{ALPHA} * \text{Matrix } W * E \quad (1)$$

$$A(t) = \text{ALPHA} * \text{Matrix } W * A(t-1) + E \quad (2)$$

The formula is applied t number of times where the matrix W reflects the weighted content matrix and vector E reflects the relevant document path. The value ALPHA reflects the probability a user will click through to a document or web page and therefore ranges between 0 and 1. Control then may continue to optional step S470, or may in alternative embodiments according to this invention, continue to step S480.

In optional step S470, the document vector A is multiplied by the weighted content matrix to determine the information scent based on the relevant document path to create an information scent keyword vector. The most relevant keyword information is then indicated by higher number entries in the information keyword vector position. Control then continues to step S480 where the process ends and control is returned to the calling step S60 of FIG. 3.

Figure 5:
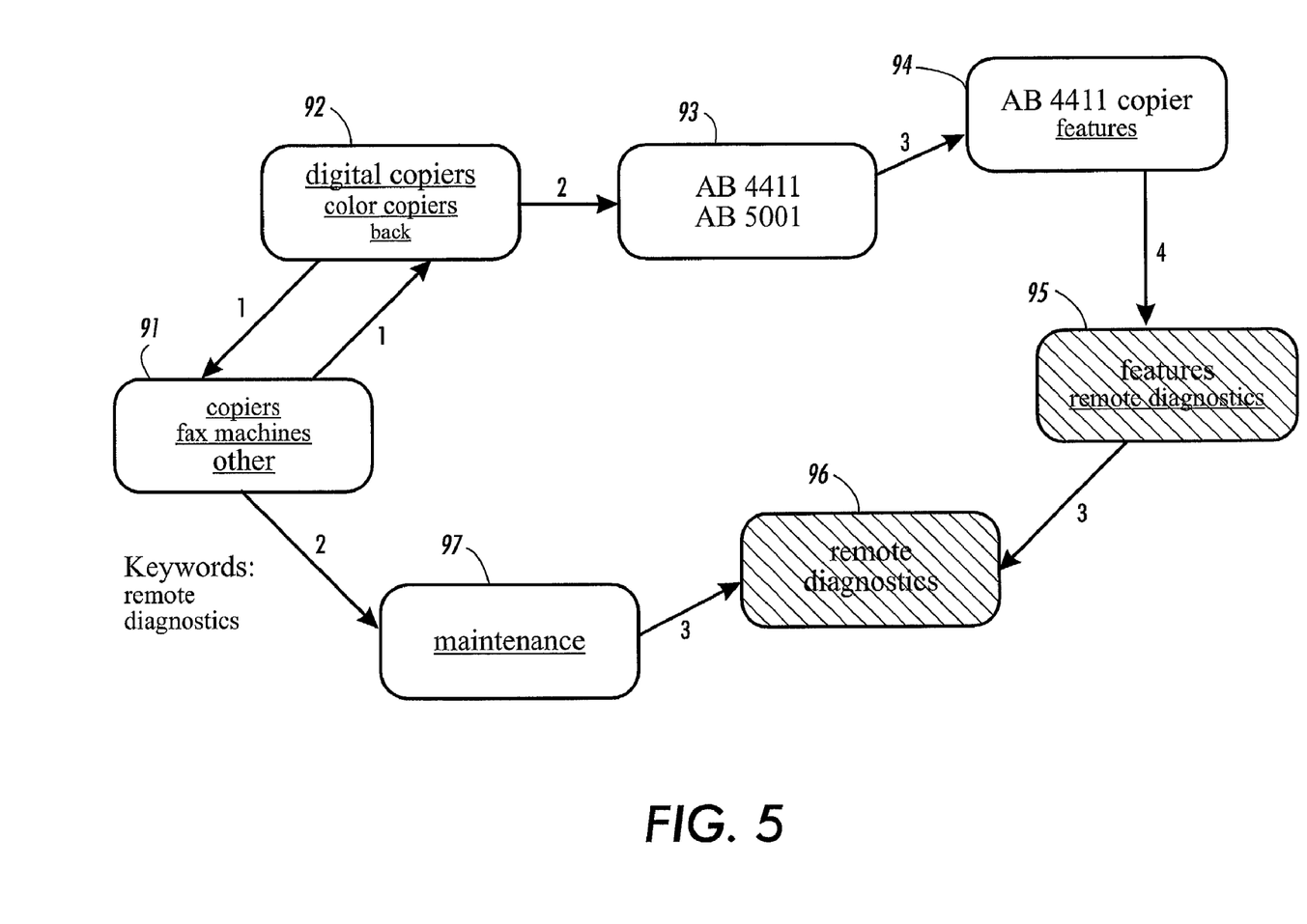
FIG. 5 shows a first view of an exemplary document collection indicating the flows of information scent according to one embodiment of this invention.

FIG. 5 shows a first view of an exemplary document collection indicating the flows of information scent according to one embodiment of this invention. The initial or starting document or web page 91 is shown with the relevant user keywords "remote diagnostics". The flow of the information scent is represented by the width of the lines connecting each document or page and a number. Connections or links are shown underlined and documents or pages that have been determined relevant are shown hatched. The user keywords "remote diagnostics" render the documents or web pages "features remote diagnostics" 95 and "remote diagnostics" 96 the most relevant. Since the flow of the information scent occurs in the opposite direction to the links, and scent is additive, the "features remote diagnostics" 95 and "remote diagnostics" 96 documents add to provide a scent value of 4 from "features remote diagnostics" 95 to "AB 4411 copier features" 94. However, the scent also diminishes with distance, therefore, the scent between "AB 4411 copier features" 94 and "AB 4411/AB 5001" 93 has a value of 3. The scent diminishes again between "AB 4411/AB 5001" 93 and "digital copiers/color copiers/back" 92. Finally between "digital copiers/color copiers/back" 92 and "copiers/fax machines/other" 91 the value is only 1.

On the other hand, the scent value between "remote diagnostics" 96 and "maintenance" 97 is 3, and the scent between "maintenance and "copiers/fax machines/other" 91 is 2. Therefore a synthesized display attribute for the "other" connection or link will be made.

Figure 8:
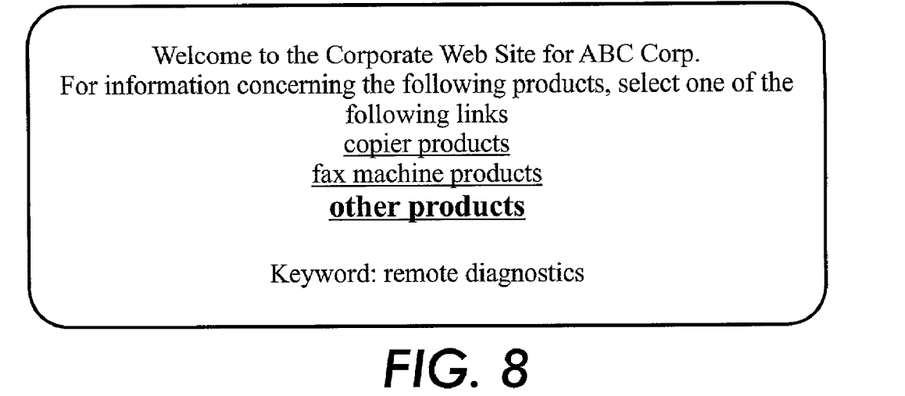
FIG. 8 shows a first view of an exemplary hypermedia document according to one embodiment of the invention.

FIG. 8 shows an exemplary hypermedia document according to one embodiment of this invention which indicates an exemplary synthesized display attribute.

Figure 6:
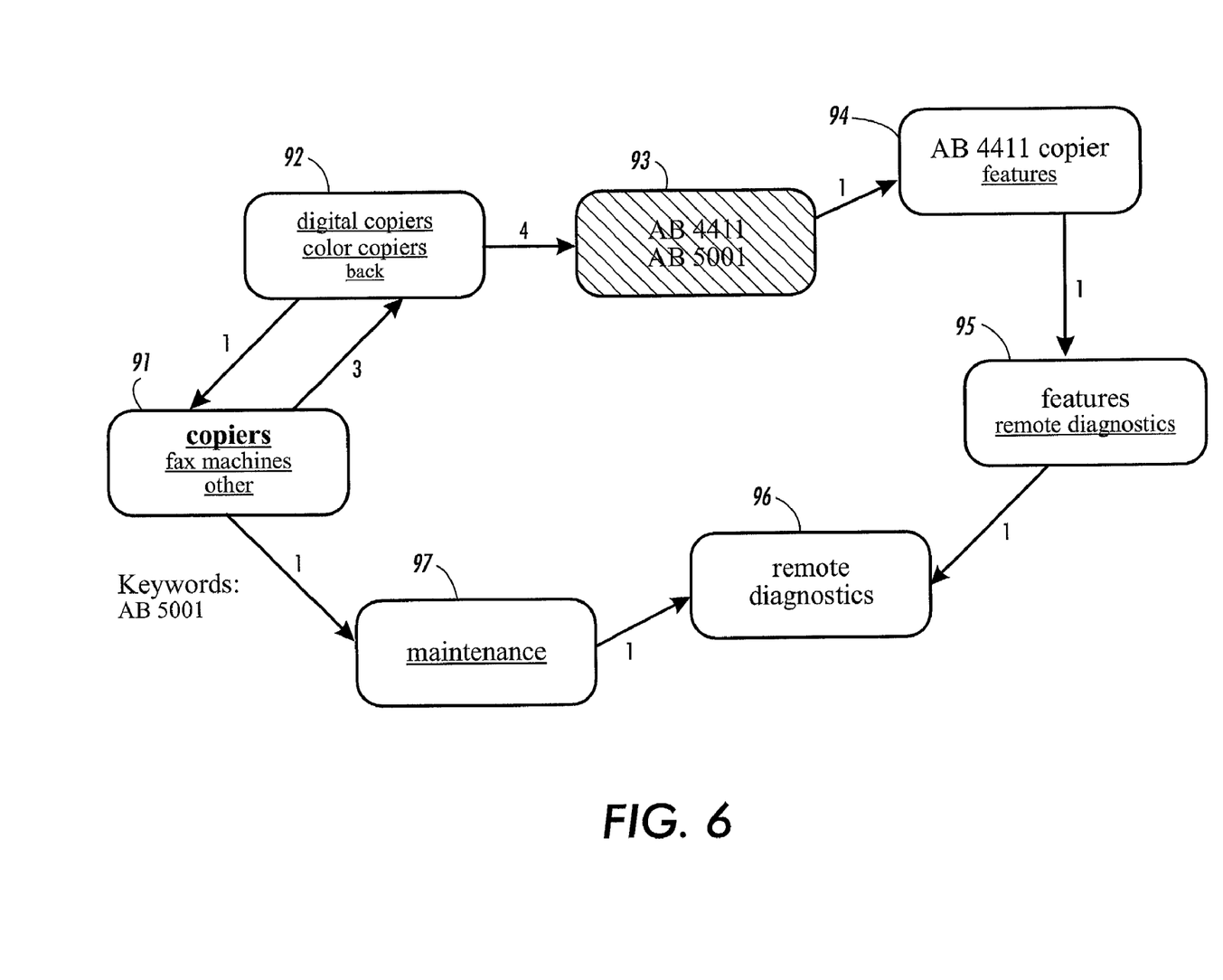
FIG. 6 shows a second view of the exemplary document collection indicating the flows of information scent according to one embodiment of this invention.

FIG. 6 shows a second view of an exemplary document collection indicating the flows of information scent according to one embodiment of this invention. The initial or starting document or web page 91 is shown with the relevant user keywords "AB 5001" reflecting the name of a copier. The user keywords "AB 5001" render the documents or web pages "AB 4411/AB5001" 93 the most relevant document. The information scent flows back towards "digital copiers/color copiers/back" 92 with a value of a 4 and from there to "copiers"/fax/machines/other" with a value of 3.

On the other hand, the scent value between "remote diagnostics" 96 and "maintenance" 97 is 1, and the scent between "maintenance and "copiers/fax machines/other" 91 is 1. Therefore a synthesized display attribute for the "copiers" connection or link will be made based on the determined information scent of 3.

Figure 9:
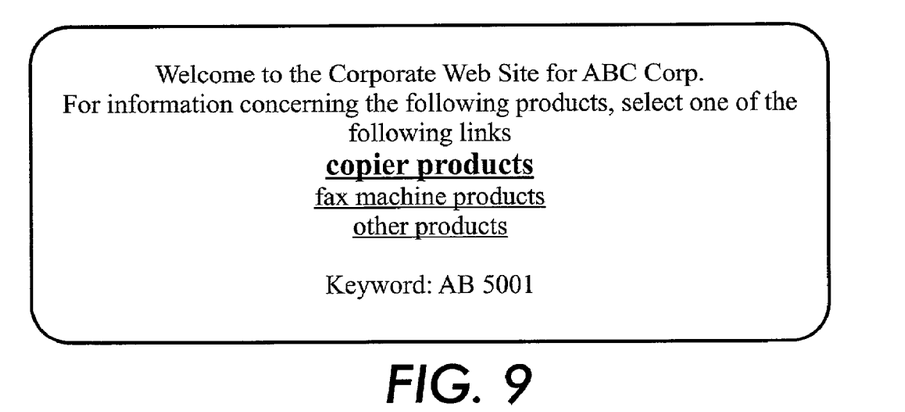
FIG. 9 shows a second view of an exemplary hypermedia document according to one embodiment of the invention.

FIG. 9 shows a second view of an exemplary hypermedia document according to one embodiment of this invention. The second view shows an exemplary synthesized display attribute for "copier products".

Figure 7:
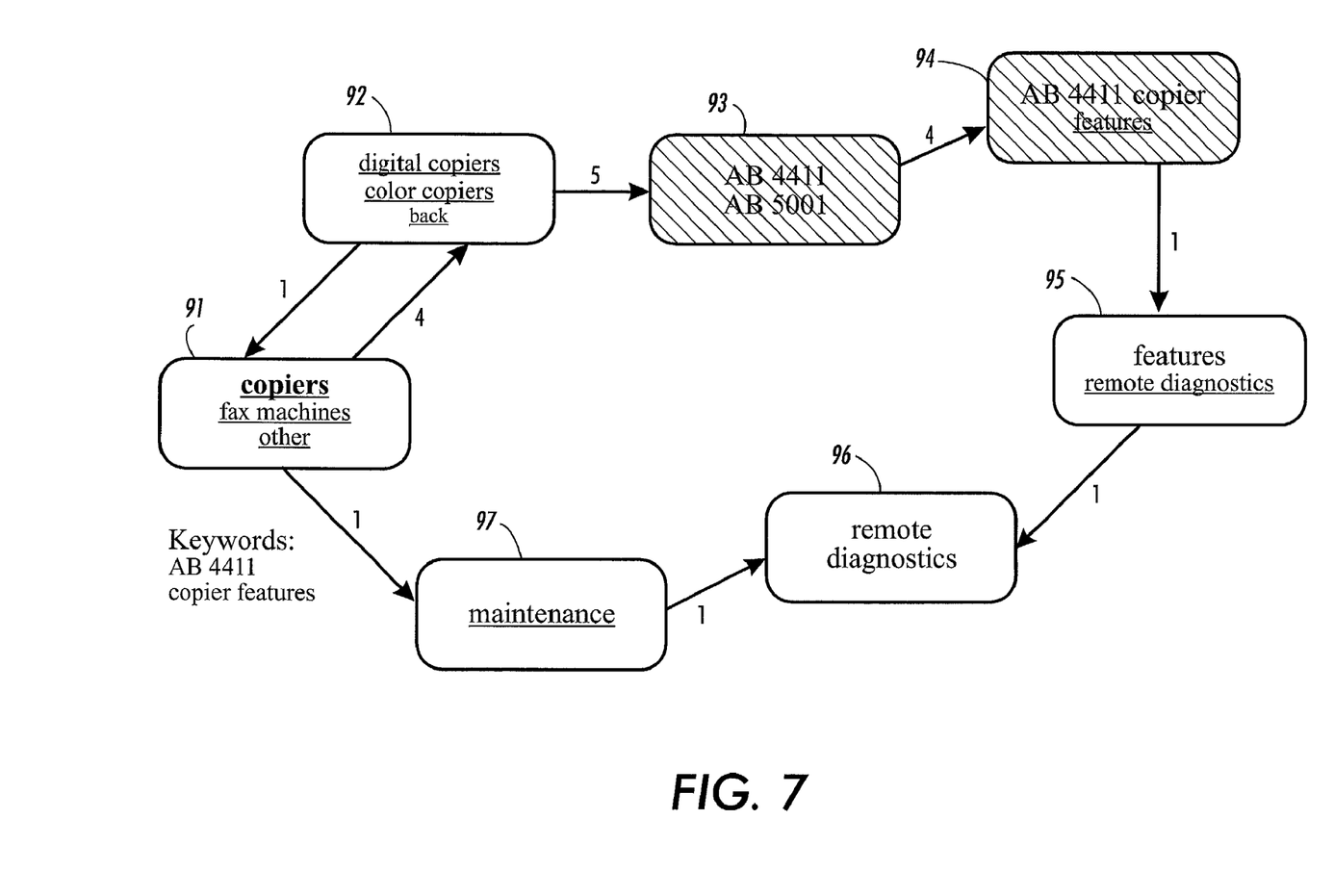
FIG. 7 shows a third view of an exemplary document collection indicating the flows of information scent according to one embodiment of this invention.

FIG. 7 shows a third view of an exemplary document collection indicating the flows of information scent according to one embodiment of this invention. The initial or starting document or web page 91 is shown with the relevant user keywords "AB 4411 copier features". The user keywords "AB 4411 copier features" render the documents or web pages "AB 4411/AB 5001" 93 and "AB 4411 copier features" 94 the most relevant. Since the flow of the information scent occurs in the opposite direction to that of the links, and information scent is additive, the "AB 4411 copier features" 94 and "AB 4411/AB 5001" 93 documents add to provide a scent value of 5 between "AB 4411/AB 5001" 93 and "digital copiers/color copiers/back" 92. However, the scent also diminishes with distance, therefore, the scent between "digital copiers/color copiers/back" 92 and "copiers/fax/machines/other" 91 has an attenuated value of 4 due to the distance from the two relevant documents or web pages.

On the other hand, the scent value between "remote diagnostics" 96 and "maintenance" 97 is 1, and the scent between "maintenance and "copiers/fax machines/other" 91 is 1. Therefore a synthesized display attribute for the "copiers" connection or link will be made based on the determined information scent of 4.

Figure 10:
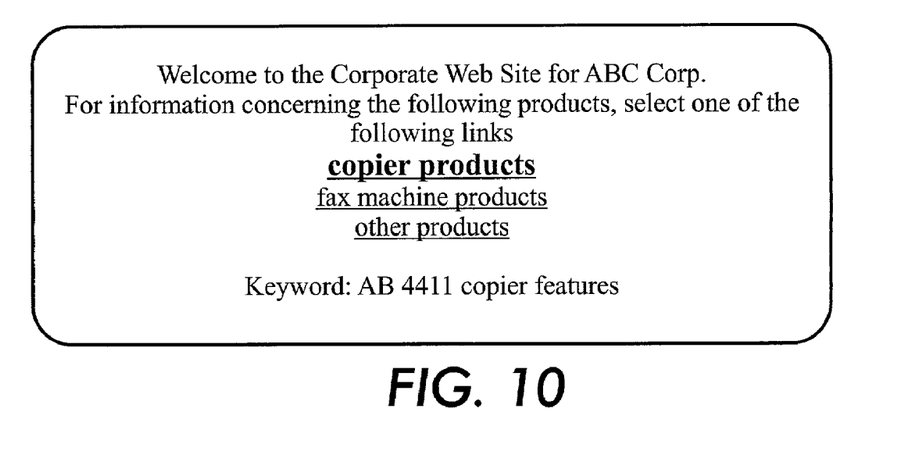
FIG. 10 shows a third view of an exemplary hypermedia document according to one embodiment of the invention.

FIG. 10 shows a third view of an exemplary hypermedia document according to one embodiment of this invention. The third view shows an exemplary synthesized display attribute for "copier products".

In the various exemplary embodiments outlined above, the system for combined browsing and searching based on information scent 100 can be implemented using a programmed general purpose computer. However, the system for combined browsing and searching based on information scent 100 can also be implemented using a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 3–4 can be used to implement the system for combined browsing and searching based on information scent 100.

Each of the circuits 10–34 of the system for combined browsing and searching based on information scent 100 outlined above can be implemented as portions of a suitably programmed general purpose computer. Alternatively, circuits 10–34 of the system for combined browsing and searching based on information scent 100 outlined above can be implemented as physically distinct hardware circuits within an ASIC, or using a FPGA, a PDL, a PLA or a PAL, or using discrete logic elements or discrete circuit elements. The particular form each of the circuits 10–34 of the system for combined browsing and searching based on information scent 100 outlined above will take is a design choice and will be obvious and predicable to those skilled in the art.

Moreover, the system for combined browsing and searching based on information scent 100 and/or each of the various circuits discussed above can each be implemented as software routines, managers or objects executing on a programmed general purpose computer, a special purpose computer, a microprocessor or the like. In this case, the system for combined browsing and searching based on information scent 100 and/or each of the various circuits discussed above can each be implemented as one or more routines embedded in the communications network, as a resource residing on a server, or the like. The system for combined browsing and searching based on information scent 100 and the various circuits discussed above can also be implemented by physically incorporating the system for combined browsing and searching based on information scent 100 into a software and/or hardware system, such as the hardware and software systems of a document server, web server or electronic library server.

As shown in FIG. 3, the memory circuits 14 and 214, can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 110 shown in FIGS. 1–2 can each be any known or later developed device or system for connecting a communication device to the system for combined browsing and searching based on information scent 100, including a direct cable connection, a connection over a wide area network or a local area network, a connection over an intranet, a connection over the Internet, or a connection over any other distributed processing network or system. In general, the communication link 110 can be any known or later developed connection system or structure usable to connect devices and facilitate communication Further, it should be appreciated that the communication link 110 can be a wired or wireless link to a network. The network can be a local area network, a wide area network, an intranet, the Internet, or any other distributed processing and storage network.

While this invention has been described in conjunction with the exemplary embodiments outlines above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for combined browsing and searching in a collection of connected content portions comprising:
   determining at least one user keyword;
   determining at least one relevant document path of connected content portions;
   determining an information scent value associated with the relevant document path by an information scent document vector generated by the following formulas applied t number of times where a matrix W reflects a weighted content matrix, vector E reflects the relevant document path, and a value ALPHA reflects a probability a user will click through to a document or web page $$A(1)=\text{ALPHA}*\text{Matrix } W*E \quad (1)$$

$$A(t)=\text{ALPHA}*\text{Matrix } W*A(t-1)+E; \quad (2)$$

synthesizing a display attribute based on the determined information scent and the at least one user keyword.

2. The method of claim 1, wherein determining content information is based on weighted word frequency of each content portion.

3. The method of claim 1, wherein each content portion in the relevant document path is weighted based on content portion position in the relevant document path.

4. The method of claim 1, wherein the synthesized display attribute relates to the connection or links among content portions.

5. The method of claim 1, wherein the display attribute is at least one of an aural, tactile, olfactory, visual and taste display characteristic.

6. A system for combined browsing and searching in a collection of connected content portions comprising:
   a controller circuit;
   a content determining circuit;
   a topology determining circuit;
   an input/output circuit for entering at least one user keyword;
   a relevant document path determining circuit that determines at least a relevant document path of connected content portions based on at least one user keyword;
   an information scent determining circuit that determines an information scent value based on the relevant document user path by an information scent document vector generated by the following formulas applied t number of times where a matrix W reflects a weighted content matrix, vector E reflects the relevant document path, and a value ALPHA reflects a probability a user will click through to a document or web page $$A(1)=\text{ALPHA}*\text{Matrix } W*E \quad (1)$$

$$A(t)=\text{ALPHA}*\text{Matrix } W*A(t-1)+E; \text{ and} \quad (2)$$

a display attribute synthesizer that synthesizes a display attribute based on the determined information scent and the at least one user keyword.

7. The system of claim 6, wherein the content determining circuit determines content information based on weighted word frequency of each content portion.

8. The system of claim 6, wherein each content portion in the relevant document path is based on the content portion position in the relevant document path.

9. The system of claim 6, wherein the synthesized display attribute is a display attribute of an associated connection among content the portions.

* * * * *